(12) United States Patent
Yasuhiro et al.

(10) Patent No.: US 12,723,863 B2
(45) Date of Patent: Sep. 1, 2026

(54) SECOND HARMONIC GENERATION (SHG) MEASUREMENT DEVICE AND MEASUREMENT METHOD USING THE SAME

(71) Applicant: SAMSUNG ELECTRONICS CO., LTD., Suwon-si (KR)

(72) Inventors: Hidaka Yasuhiro, Yokohama (JP); Ingi Kim, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 111 days.

(21) Appl. No.: 18/968,696

(22) Filed: Dec. 4, 2024

(65) Prior Publication Data

US 2025/0189295 A1 Jun. 12, 2025

(30) Foreign Application Priority Data

Dec. 6, 2023 (JP) ................................ 2023-206308
Jun. 12, 2024 (KR) ........................ 10-2024-0076610

(51) Int. Cl.
*G01B 9/02002* (2022.01)
*G01B 9/02* (2022.01)
(Continued)

(52) U.S. Cl.
CPC ..... *G01B 9/02002* (2013.01); *G01B 9/02041* (2013.01); *G01B 11/065* (2013.01);
(Continued)

(58) Field of Classification Search
CPC ............ G01B 9/02002; G01B 9/02041; G01B 11/065; G01B 11/0675; G01N 21/8806;
(Continued)

(56) References Cited

U.S. PATENT DOCUMENTS 5,294,289 A 3/1994 Heinz et al.
6,788,405 B2 9/2004 Hunt
(Continued)

FOREIGN PATENT DOCUMENTS

JP H04340404 A2 11/1992
JP H05142156 A2 6/1993
(Continued)

OTHER PUBLICATIONS

Bloembergen, et al., "Light Waves at the Boundary of Nonlinear Media", Phys. Rev. 128, Division of Engineering and Applied Physics, Harvard University, Cambridge, Massachusetts, vol. 128, No. 2, Oct. 15, 1962, pp. 606-622.
(Continued)

*Primary Examiner* — Dominic J Bologna
(74) *Attorney, Agent, or Firm* — Morgan, Lewis & Bockius LLP

(57) ABSTRACT

A measurement device includes a light source configured to emit a fundamental wave that is a femtosecond pulsed laser beam, a second harmonic generator configured to convert a portion of the fundamental wave into a first-second harmonic, a birefringent crystal configured to split an angle for the first-second harmonic, a wavelength selection element configured to block the fundamental wave and transmit therethrough the first-second harmonic and a second-second harmonic, a polarizer configured to polarize the first-second harmonic and the second-second harmonic to approximately same polarizations, and an image detector.

20 Claims, 13 Drawing Sheets

(51) Int. Cl.
*G01B 11/06* (2006.01)
*G01N 21/88* (2006.01)
*G01N 21/95* (2006.01)
*G01N 21/956* (2006.01)

(52) U.S. Cl.
CPC ..... *G01B 11/0675* (2013.01); *G01N 21/8806* (2013.01); *G01N 21/9501* (2013.01); *G01N 21/956* (2013.01); *G01N 2021/8848* (2013.01)

(58) Field of Classification Search
CPC ............. G01N 21/9501; G01N 21/956; G01N 2021/8848
See application file for complete search history.

(56) References Cited

U.S. PATENT DOCUMENTS

| | | | | |
|---|---|---|---|---|
| 6,791,099 | B2 | 9/2004 | Some et al. | |
| 6,856,159 | B1 | 2/2005 | Tolk et al. | |
| 8,339,611 | B2 * | 12/2012 | Kuramoto | G01B 9/02008 356/486 |
| 11,293,965 | B2 | 4/2022 | Koldiaev et al. | |
| 11,946,863 | B2 | 4/2024 | Lei | |
| 2002/0180977 | A1 * | 12/2002 | Fu | G01J 9/02 356/450 |
| 2018/0217193 | A1 | 8/2018 | Koldiaev et al. | |
| 2020/0057104 | A1 | 2/2020 | Ma et al. | |
| 2020/0088784 | A1 * | 3/2020 | Lei | G01N 21/636 |
| 2020/0110029 | A1 * | 4/2020 | Lei | G01N 21/636 |
| 2021/0199575 | A1 * | 7/2021 | Wessel | G01B 9/02011 |
| 2024/0183796 | A1 | 6/2024 | Hidaka et al. | |
| 2025/0224327 | A1 * | 7/2025 | James | G01N 21/211 |

FOREIGN PATENT DOCUMENTS

| | | | |
|---|---|---|---|
| JP | H05226431 | A2 | 9/1993 |
| JP | H05264468 | A2 | 10/1993 |
| JP | 2518547 | | 5/1996 |
| JP | 1998010047 | A2 | 1/1998 |
| JP | 2004529327 | A2 | 9/2004 |
| JP | 2020153761 | A2 | 9/2020 |
| JP | 2021522686 | A2 | 8/2021 |
| JP | 2021530670 | A2 | 11/2021 |
| JP | 2021531641 | A2 | 11/2021 |
| JP | 2022160395 | A2 | 10/2022 |
| JP | 2024080718 | A2 | 6/2024 |
| WO | 2002065108 | | 8/2002 |

OTHER PUBLICATIONS

Guidotti, et al., "Second-Harmonic Generation in Centro-Symmetric Semiconductors", Solid state communications 46.4 , vol. 8 D, N. 4, Oct. 986, pp.385-416.

Terlinden, et al., "Second-harmonic intensity and phase spectroscopy as a sensitive method to probe the space-charge field in Si(100) covered with charged dielectrics", in Journal of Vacuum Science & Technology A 32.2 (2014), found on the internet at http://dx.doi.org/10.1116/1.4862145, 10 pages.

* cited by examiner

FIG. 6

100
112
604
605
101
601
602
603
Frame grabber
Femto-second laser controller
Stage controller
606

(a)

(b)

SECOND HARMONIC GENERATION (SHG) MEASUREMENT DEVICE AND MEASUREMENT METHOD USING THE SAME

CROSS-REFERENCE TO RELATED APPLICATIONS

This application claims priority under 35 U.S.C. § 119 to Korean Patent Application No. 10-2024-0076610, filed on Jun. 12, 2024, in the Korean Intellectual Property Office, and Japanese Patent Application No. 2023-206308, filed on Dec. 6, 2023, in the Japanese Intellectual Property Office, the disclosures of which are incorporated by reference herein in their entireties.

TECHNICAL FIELD

The present disclosure relates to a measurement device and, more specifically, to a second harmonic generation (SHG) measurement device a measurement method using the same.

DISCUSSION OF THE RELATED ART

Up until about 20 years ago, the primary focus on improving the manufacture of semiconductor devices was on refining circuit patterns, which would be used to achieve performance gains in driving speed, reduced power consumption, and in some cases, reduced manufacturing costs.

In recent years, the importance of enhancing semiconductor performance through controlling physical properties has grown. This includes improving electron mobility by using new materials like high-K or low-K materials and deliberately adding stress or distortion. These advancements, combined with the increasing complexity of refining circuits and creating three-dimensional device structures, have made precise, high-throughput physical property measurements critical for both research and development and improving production yields. For instance, it is essential to measure the amount or distribution of impurities in ion implantation, the reactivation state after annealing, or internal stress during selective epitaxial growth of silicon germanium (SiGe).

Traditional physical measurement devices, such as optical critical dimension (OCD) systems and critical dimension scanning electron microscopes (CD-SEMs), cannot perform these evaluations. While chemical methods like fluorescent X-rays and mass spectrometry are precise, they can be destructive and are not suited for high-throughput processes. Electrical characteristic evaluations, such as inspecting metal-oxide-silicon (MOS) transistors for capacitance-voltage (C-V) characteristics, involve direct performance checks using probes. Techniques like laser-assisted device alteration (LADA) and optical beam induced resistance change (OBIRCH) can detect defects and their locations but are limited to contact-based measurements that are only feasible in post-processing stages with wiring or pads.

SUMMARY

A measurement device includes a light source configured to emit a fundamental wave that is a femtosecond pulsed laser beam, a second harmonic generator configured to convert a portion of the fundamental wave into a first-second harmonic, a birefringent crystal configured to split an angle for the first-second harmonic, a wavelength selection element configured to block the fundamental wave and transmit therethrough the first-second harmonic and a second-second harmonic, a polarizer configured to polarize the first-second harmonic and the second-second harmonic to approximately same polarizations, an image detector configured to convert the first-second harmonic and the second-second harmonic, which are incident at different angles from each other, into an electrical signal, and a processing device configured to obtain a strength of the second-second harmonic from an amplitude of an interference pattern appearing on the image detector. A wavelength of the first-second harmonic is approximately half a wavelength of the fundamental wave, and the second-second harmonic is generated by casting the fundamental wave onto a surface of an object to be measured.

A measurement device includes a second harmonic generator including a nonlinear optical crystal configured to convert, into a first-second harmonic, a portion of a fundamental wave emitted from a light source, a condensing lens configured to concentrate the fundamental wave onto the second harmonic generator, a birefringent crystal configured to split an angle for the first-second harmonic, a collimator lens arranged between the second harmonic generator and the birefringent crystal and configured to refract the fundamental wave and the first-second harmonic to form parallel light, a wavelength selection element configured to block the fundamental wave and transmit therethrough the first-second harmonic and a second-second harmonic, a polarizer arranged between a plurality of relay lens and configured to polarize the first-second harmonic and the second-second harmonic to approximately same polarizations, an image detector configured to convert the first-second harmonic and the second-second harmonic, which are incident at different angles from each other, into an electrical signal, a processing device configured to obtain a strength of the second-second harmonic from an amplitude of an interference pattern appearing on the image detector, a wavelength plate configured to convert the first-second harmonic, of which the angle has been split in the birefringent crystal, into circular polarization, and a beam splitter configured to split, into two polarization components, the first-second harmonic having passed through the wavelength selection element and the second-second harmonic having passed through the wavelength selection element.

A measurement device includes a second harmonic generator including a nonlinear optical crystal configured to convert, into a first-second harmonic, a portion of a fundamental wave emitted from a light source, a condensing lens configured to concentrate the fundamental wave onto the second harmonic generator, a birefringent crystal configured to split an angle for the first-second harmonic, a collimator lens arranged between the second harmonic generator and the birefringent crystal and configured to refract the fundamental wave and the first-second harmonic to form parallel light, a wavelength selection element configured to block the fundamental wave and transmit therethrough the first-second harmonic and a second-second harmonic, a polarizer arranged between a plurality of relay lens and configured to polarize the first-second harmonic and the second-second harmonic to approximately same polarizations, an image detector configured to convert the first-second harmonic and the second-second harmonic, which are incident at different angles from each other, into an electrical signal, a processing device configured to obtain a strength of the second-second harmonic from an amplitude of an interference pattern appearing on the image detector, a wavelength plate configured to convert the first-second harmonic, of which the angle has been split in the birefringent crystal, into circular polarization, and a beam splitter configured to split, into two polarization components, the first-second harmonic having passed through the wavelength selection element and the second-second harmonic having passed through the wavelength selection element, wherein the image detector includes a first image detector configured to convert, into an electrical signal, one of the two polarization components of the second-second harmonic split by the beam splitter and a second image detector configured to convert the other one of the polarization components into an electrical signal, and the wavelength selection element includes a prism configured to change a traveling direction of light for each wavelength, a diffraction grating configured to change the traveling direction of the light for each wavelength, and a relay lens iris configured to transmit the first-second harmonic and the second-second harmonic therethrough.

BRIEF DESCRIPTION OF THE DRAWINGS

Embodiments of the inventive concept will be more clearly understood from the following detailed description taken in conjunction with the accompanying drawings in which:

FIG. 6 is a schematic diagram illustrating a semiconductor inspection device including the measurement device of FIG. 1, according to an embodiment;

DETAILED DESCRIPTION OF THE EMBODIMENTS

The embodiments may allow various kinds of change or modification and various changes in form, and specific embodiments will be illustrated in drawings and described in detail in the specification. However, it is not necessarily intended to limit the embodiments to a particular disclosure form. In addition, the embodiments described below may be illustrative and various changes in form and details may be made therein.

Hereinafter, unless there is a particular description, in the specification, the vertical direction may be defined as a Z direction, and each of a first horizontal direction and a second horizontal direction may be defined as a horizontal direction perpendicular to the Z direction. The first horizontal direction may be indicated by X, and the second horizontal direction may be indicated by Y. A vertical level may indicate a height level according to a vertical direction Z. A horizontal width may indicate a length in a horizontal direction X and/or Y, and a vertical length may indicate a length in the vertical direction Z.

It is noted herein that terms such as "approximate" and "approximately" etc. are used to allow for a slight variation from equivalence, for example, a 10% variation, a 5% variation, a 2% variation, a 1% variation, a 0.5% variation, or a 0.2% variation.

Figure 1:
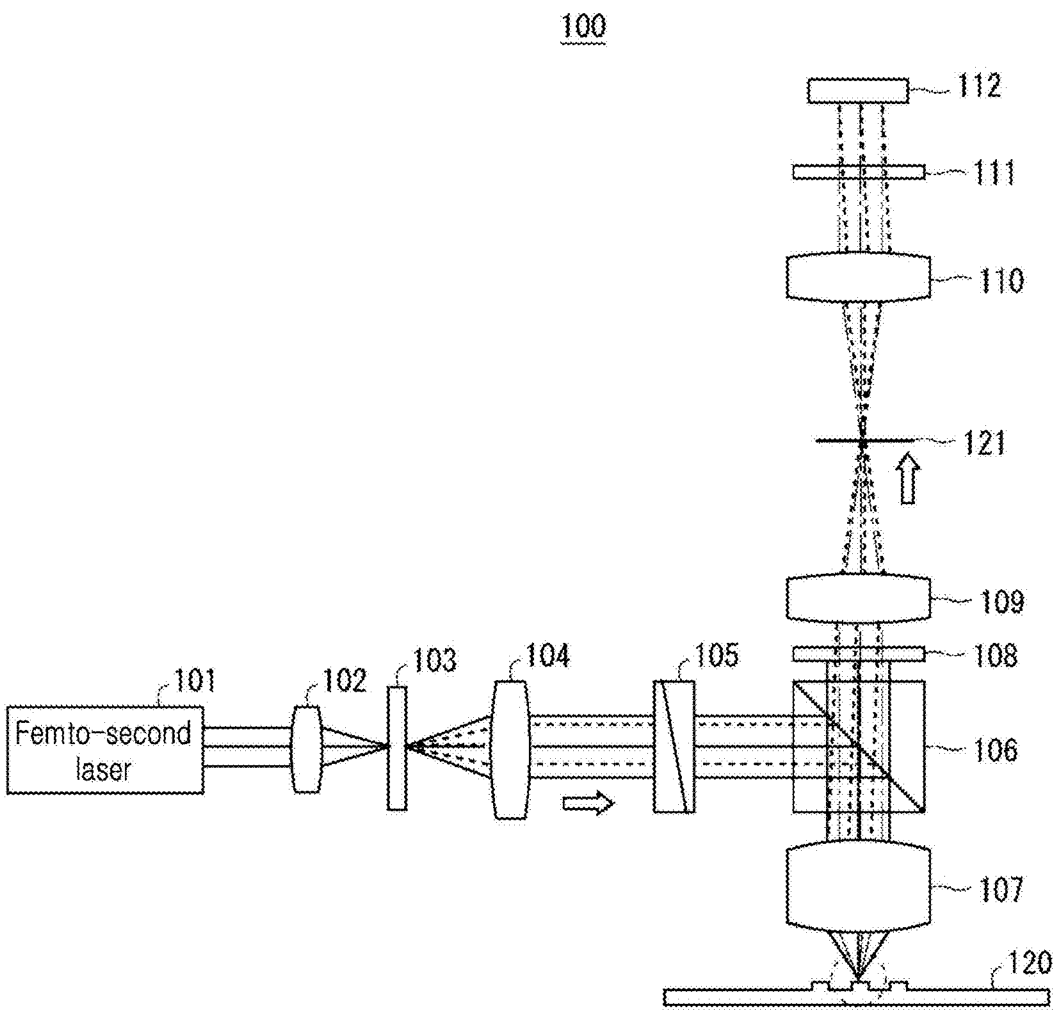
FIG. 1 is a cross-sectional view of a measurement device according to an embodiment.

FIG. 1 is a cross-sectional view of a measurement device 100 according to an embodiment.

Referring to FIG. 1, the measurement device 100, according to the inventive concept, may include a light source 101, a condensing lens 102, a nonlinear optical crystal 103, a collimator lens 104, a birefringent crystal 105, a beam splitter 106, an objective lens 107, a wavelength selection element 108, relay lenses 109 and 110, a relay lens iris 121, a linear polarizing plate 111, and an image detector 112.

The light source 101 may emit a laser beam of a certain wavelength to the condensing lens 102. For example, the light source 101 may be a femtosecond pulsed laser of which the pulse width is 1 picosecond or less. A laser beam emitted from the light source 101 may be a fundamental wave.

The condensing lens 102 may concentrate the laser beam emitted from the light source 101, at the position of the nonlinear optical crystal 103.

The nonlinear optical crystal 103 may function as a second harmonic generation element (e.g., a second harmonic generator). Hereinafter, the nonlinear optical crystal 103 may correspond to a second harmonic generator configured to convert a portion of the fundamental wave into a first-second harmonic. For example, the nonlinear optical crystal 103 may split the laser beam emitted from the light source 101 into the fundamental wave and the first-second harmonic having a frequency that is approximately two times the frequency of the fundamental wave, i.e., having a wavelength that is approximately half the wavelength of the fundamental wave. The nonlinear optical crystal 103 may split the laser beam emitted from the light source 101 into the fundamental wave and the first-second harmonic having a frequency that is two times the frequency of the fundamental wave, i.e., having a wavelength that is half the wavelength of the fundamental wave. The nonlinear optical crystal 103 may preferably satisfy a phase matching condition of type I. For example, the nonlinear optical crystal 103 satisfying the phase matching condition of type I may include lithium triborate (LBO), beta-barium borate (BBO), or potassium titanyl phosphate (KTP).

The collimator lens 104 may be disposed between the nonlinear optical crystal 103 that is a second harmonic generator and the birefringent crystal 105 and refract the fundamental wave and the first-second harmonic of the laser beam from the nonlinear optical crystal 103 to form parallel light. The optical axis of the fundamental wave of the laser beam may be the same as the optical axis of the first-second harmonic of the laser beam.

The birefringent crystal 105 may make the angles of the optical axes of the fundamental wave and the first-second harmonic having polarizing directions perpendicular to each other be off from the same axis. In addition, the birefringent crystal 105 may correct the phase difference between the fundamental wave and the first-second harmonic due to wavelength dispersion occurring between the nonlinear optical crystal 103 and an object 120 to be measured. By the correction of the birefringent crystal 105, the optical path lengths of the fundamental wave and the first-second harmonic from the second harmonic generator to the surface of the object 120 to be measured are approximately the same. Furthermore, by the correction of the birefringent crystal 105, the optical path lengths of the fundamental wave and the first-second harmonic from the second harmonic generator to the surface of the object 120 to be measured may be same. The birefringent crystal 105 may be, for example, a Wollaston prism, a Rochon prism, or a Nomarski prism.

The beam splitter 106 may reflect the laser beam from the birefringent crystal 105 to the objective lens 107. The objective lens 107 may correspond to an objective optical system. In addition, the beam splitter 106 may transmit therethrough the laser beam from the objective lens 107 to the wavelength selection element 108.

The objective lens 107 may refract the laser beam from the beam splitter 106 such that the refracted laser beam is focused on a measurement point of the object 120 to be measured. The fundamental wave of the laser beam may be focused on the measurement point of the object 120 to be measured, and a second-second harmonic of a different strength, polarization, and phase may be generated according to a material, a structure, or an electric field state inside a semiconductor device that is the object 120 to be measured. In addition, although the first-second harmonic is also focused on the object 120 to be measured, the first-second harmonic is a little off from the fundamental wave due to an angle difference by the birefringent crystal 105.

The wavelength selection element 108 may cut the fundamental wave of the laser beam. For example, a dichroic filter is suitable for the wavelength selection element 108. The wavelength selection element 108 may be vertically spaced apart from the beam splitter 106.

The relay lens 109 and the relay lens 110 are an optical system configured to form an image on the image detector 112. The relay lens 109 may refract the fundamental wave, the first-second harmonic and the second-second harmonic at different angles for each wavelength. In addition, the fundamental wave of the laser beam is cut by an iris plate of the relay lens iris 121. In addition, at least the first-second harmonic and the second-second harmonic pass through an iris hole of the relay lens iris 121. For example, for the relay lens 109 and the relay lens 110, a prism or a refractive grating configured to change the traveling direction of light for each wavelength may be suitable. Furthermore, the relay lens 109 and the relay lens 110 may be arranged such that only the first-second harmonic and the second-second harmonic pass through the iris hole of the relay lens iris 121. Furthermore, the cutting of the fundamental wave may be realized through at least one of the wavelength selection element 108 and the relay lens iris 121.

The linear polarizing plate (polarizer) 111 may approximately match the polarizing state of the first-second harmonic of the laser beam and the polarizing state of the second-second harmonic of the laser beam. Furthermore, the linear polarizing plate 111 may match the polarizing state of the first-second harmonic of the laser beam and the polarizing state of the second-second harmonic of the laser beam.

The image detector 112 may receive light on each of two-dimensional coordinates and convert the light into an electrical signal. The image detector 112 is arranged at an optically approximately conjugate position with the birefringent crystal 105. For example, a position where the image detector 112 is arranged is a position on the image detector 112 where the first-second harmonic and the second-second harmonic split with an angle return to the same point. Furthermore, the image detector 112 may be arranged at an optically conjugate position with the birefringent crystal 105.

By the structure described above, the measurement device 100 measures the object 120 to be measured. Next, a measurement principle of the measurement device 100 is described.

First, the fundamental wave of the laser beam of which the pulse width is one picosecond or less is emitted from the light source 101.

The laser beam is refracted by the condensing lens 102 so as to be concentrated onto the nonlinear optical crystal 103.

In addition, the laser beam is split by the nonlinear optical crystal 103 to the fundamental wave and the first-second harmonic having a frequency that is two times the frequency of the fundamental wave.

Both the fundamental wave and the first-second harmonic of the laser beam become parallel light by the collimator lens 104. Herein, the polarizing direction of the fundamental wave of the laser beam is perpendicular to the polarizing direction of the first-second harmonic of the laser beam.

Figure 2:
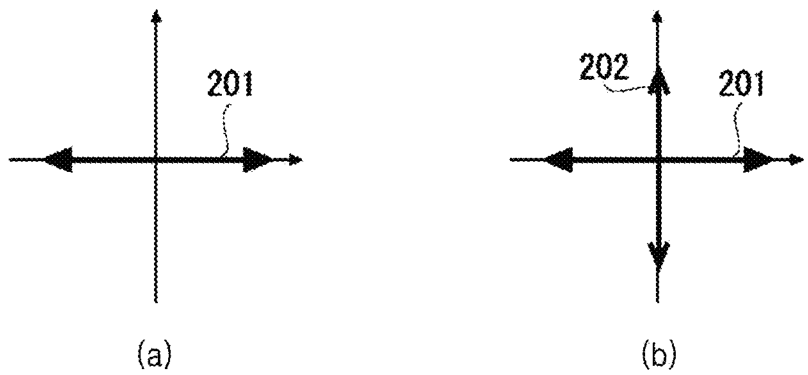
FIG. 2 is a conceptual diagram illustrating a polarization state in an optical axis cross-section in the measurement device of FIG. 1, according to an embodiment.

FIG. 2 is a conceptual diagram illustrating a polarization state on an optical axis cross-section in the measurement device 100 of FIG. 1, according to an embodiment.

FIG. 2 is described with reference to FIG. 1. In FIG. 2, element (a) illustrates a polarization 201 of the fundamental wave of the laser beam traveling toward the condensing lens 102 from the light source 101. In addition, element (b) illustrates the polarization 201 of the fundamental wave of the laser beam and a polarization 202 of the first-second harmonic of the laser beam traveling toward the beam splitter 106 from the collimator lens 104. As illustrated in elements (a) and (b) of FIG. 2, the polarization 201 of the fundamental wave of the laser beam is approximately perpendicular to the polarization 202 of the first-second harmonic of the laser beam. Furthermore, the polarization 201 of the fundamental wave of the laser beam may be perpendicular to the polarization 202 of the first-second harmonic of the laser beam.

In addition, the fundamental wave and the first-second harmonic of the laser beam becoming the parallel light are incident to the birefringent crystal 105.

In addition, the optical axis of the fundamental wave of the laser beam is a little off from the optical axis of the first-second harmonic of the laser beam by the birefringent crystal 105.

The fundamental wave of the laser beam and the first-second harmonic of the laser beam are reflected in the beam splitter 106 in the direction of the objective lens 107.

In addition, the fundamental wave of the laser beam and the first-second harmonic of the laser beam are concentrated onto the measurement point of the object 120 to be measured by the objective lens 107. Furthermore, because the optical axis of the fundamental wave of the laser beam is off from the optical axis of the first-second harmonic of the laser beam by the birefringent crystal 105, a position of the object 120 to be measured where the fundamental wave of the laser beam is cast is also off from a position of the object 120 to be measured where the first-second harmonic of the laser beam is cast.

Figure 3:
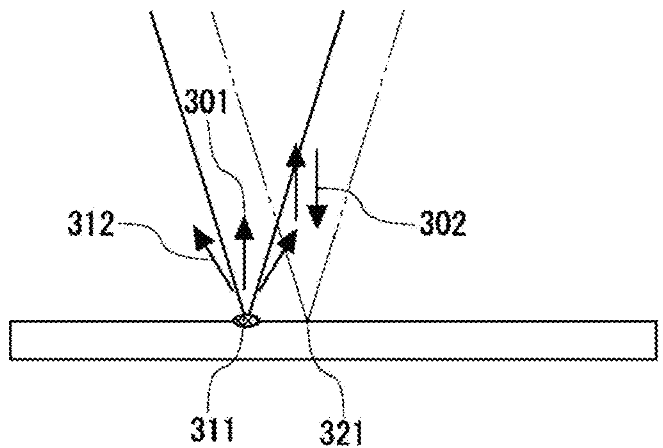
FIG. 3 is a magnified view illustrating an optical path around an object to be measured, in the measurement device of FIG. 1, according to an embodiment.

FIG. 3 is a magnified view illustrating an optical path around an object to be measured, in the measurement device 100 of FIG. 1, according to an embodiment.

FIG. 3 is described with reference to FIGS. 1 and 2. As shown in FIG. 3, a fundamental wave 301 of a laser beam is reflected from a measurement point 311, and a second-second harmonic 312 is simultaneously generated on the surface of an object to be measured. In addition, a first-second harmonic 302 is reflected from a position 321 off from the measurement point 311.

The reflected fundamental wave 301, first-second harmonic 302, and second-second harmonic 312 of the laser beam are incident to the dichroic filter included in the wavelength selection element 108 through the objective lens 107 and the beam splitter 106. By the dichroic filter, the fundamental wave 301 of the laser beam is cut and the first-second harmonic 302 and the second-second harmonic 312 of the laser beam pass.

In addition, the first-second harmonic 302 and the second-second harmonic 312 of the laser beam are incident to the linear polarizing plate 111 through the relay lens 109 and the relay lens 110. In the linear polarizing plate 111, the first-second harmonic 302 and the second-second harmonic 312 of the laser beam are polarized.

Correction of a wavelength-specific phase difference by the nonlinear optical crystal 103 and matching of a polarizing state by the linear polarizing plate 111 enable the first-second harmonic 302 to be interfere with the second-second harmonic 312, thereby forming an interference pattern on the image detector 112.

Figure 4:
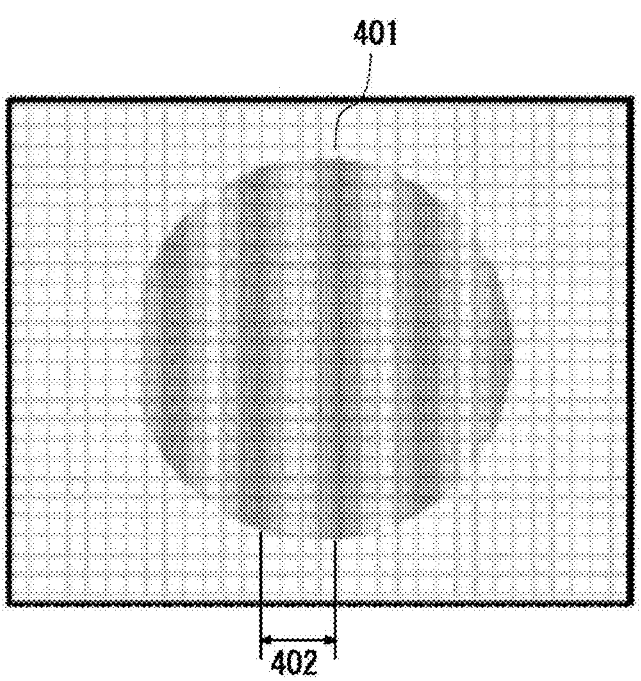
FIG. 4 is a diagram illustrating an interference pattern on an image detector in the measurement device of FIG. 1, according to an embodiment.

FIG. 4 illustrates an interference pattern 401 on the image detector 112 in the measurement device 100 of FIG. 1, according to an embodiment.

FIG. 4 is described with reference to FIGS. 1 to 3. Referring to FIG. 4, on a two-dimensional grating of the image detector 112, the interference pattern 401 appears at a position where a first-second harmonic and a second-second harmonic of a laser beam are cast.

As described above, an interference pattern is formed by using an illuminating fundamental wave to generate the first-second harmonic at a point other than an object to be measured (e.g., a semiconductor wafer) and inputting the second-second harmonic generated on the semiconductor wafer and the first-second harmonic to the image detector 112 at a little different angles.

Furthermore, an interval 402 of the interference pattern 401 corresponds to a split angle in the birefringent crystal 105 and may be set at a different angle according to measurement. When considering that the light source 101 is a femtosecond laser, a possible interference distance may be formed in a range of about 1 μm to about 100 μm. When the split angle is too large, the contrast of the interference pattern 401 may decrease at an end of the interference pattern 401 such that a signal-to-noise ratio for the amplitude of the interference pattern 401 decreases. Therefore, when λ and Δλ of the light source 101 and NA of the objective lens 107 are determined, an upper limit d_u of the fundamental wave and a second harmonic are obtained using Equation 1.

$$d \leq \lambda^2/(2 \cdot \Delta\lambda \cdot NA) \quad \text{[Equation 1]}$$

On the contrary, when the split angle is small, the decrease in the contract of the interference pattern 401 may be avoided, but a position resolution in the interference pattern 401 may decrease. If it is assumed that λ1 is the wavelength of the fundamental wave and λ2 is the wavelength of the second harmonic, a lower limit d_1 may be obtained using Equation 2.

$$d \geq 0.66/NA \cdot (\lambda_1 + \lambda_2) \quad \text{[Equation 2]}$$

Figure 5:
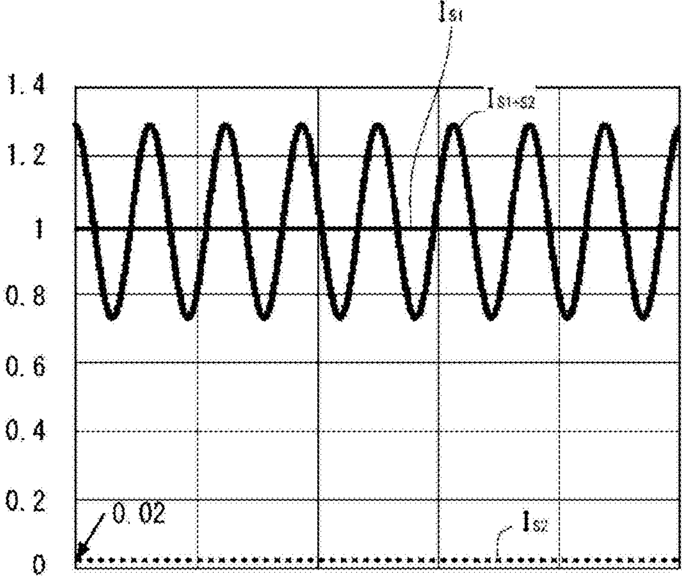
FIG. 5 is a graph illustrating a detection signal of the measurement device of FIG. 1, according to an embodiment.

A cross-section of an obtained interference pattern image corresponds to $I_{S1+S2}$ of FIG. 5. FIG. 5 is a graph illustrating a detection signal of the measurement device 100 of FIG. 1, according to an embodiment. In FIG. 5, the vertical axis indicates the strength of the detection signal. In addition, the horizontal axis indicates time. Hereinafter, FIG. 5 is described with reference to FIGS. 1 to 4.

Herein, if it is assumed that $I_{S1}=1$ and $I_{S2}=0.02$, according to an existing method, the detection signal is $I_{S2}$ and is very small. According to the inventive concept, the detection signal is $I_{S1+S2}$, and because an alternating current (AC) component of the detection signal is 0.28, 10 times or more the signal strength of the existing method may be obtained. The strength of $I_{S1}$ may be arbitrary set and may be properly set according to the strength of $I_{S2}$ to be greater than the strength of $I_{S2}$ under any circumstance.

$I_{S1+S2}$ is derived as described below. Equation 3 and Equation 4 represent an electric field ($E_{S1}$) of a first-second harmonic and an electric field ($E_{S2}$) of a second-second harmonic, respectively. In addition, Equation 5 represents the strength ($I_{S1}$) of the first-second harmonic and the strength ($I_{S2}$) of the second-second harmonic. Furthermore, a strength is a square of an amplitude. The second-second harmonic includes a term (φ(x)) corresponding to a phase change, and this term is a function of a position (x) in a direction perpendicular to an interference pattern on the image detector 112.

$$E_{S1} = |E_{S1}| \cdot \exp\{i(wt - kr)\} \quad \text{[Equation 3]}$$

$$E_{S2} = |E_{S2}| \cdot \exp\{i(wt - kr + \varphi(t))\} \quad \text{[Equation 4]}$$

$$I_{S1} = |E_{S1}|^2,\ I_{S2} = |E_{S2}|^2 \quad \text{[Equation 5]}$$

Equation 6 represents the strength of interference light of the first-second harmonic and the second-second harmonic, and in Equation 6, first two terms are direct current (DC) components, and a third term is an AC component temporally varying by φ(x). An observed amplitude of the AC component may be represented by $2 \cdot |E_{S1}||E_{S2}|$, and $|E_{S2}|$ may be obtained because $I_{S2}=|E_{S2}|^2$ of the DC components is too small to be ignored.

$$I_{S1+S2} = |E_{S1}|^2 + |E_{S2}|^2 + 2|E_{S1}||E_{S2}| \cdot \cos(i\varphi(x)) \quad \text{[Equation 6]}$$

Herein, in an existing measurement technique, $I_{S2}=|E_{S2}|^2$ is observed but is very small because of a square of the electric field ($E_{S2}$) that is weak. In addition, with respect to $2 \cdot |E_{S1}||E_{S2}|\cos(i\varphi(x))$ that is the AC component of the interference light, proper light intensity may be observed by setting the electric field ($E_{S1}$) to be large.

Figure 6:
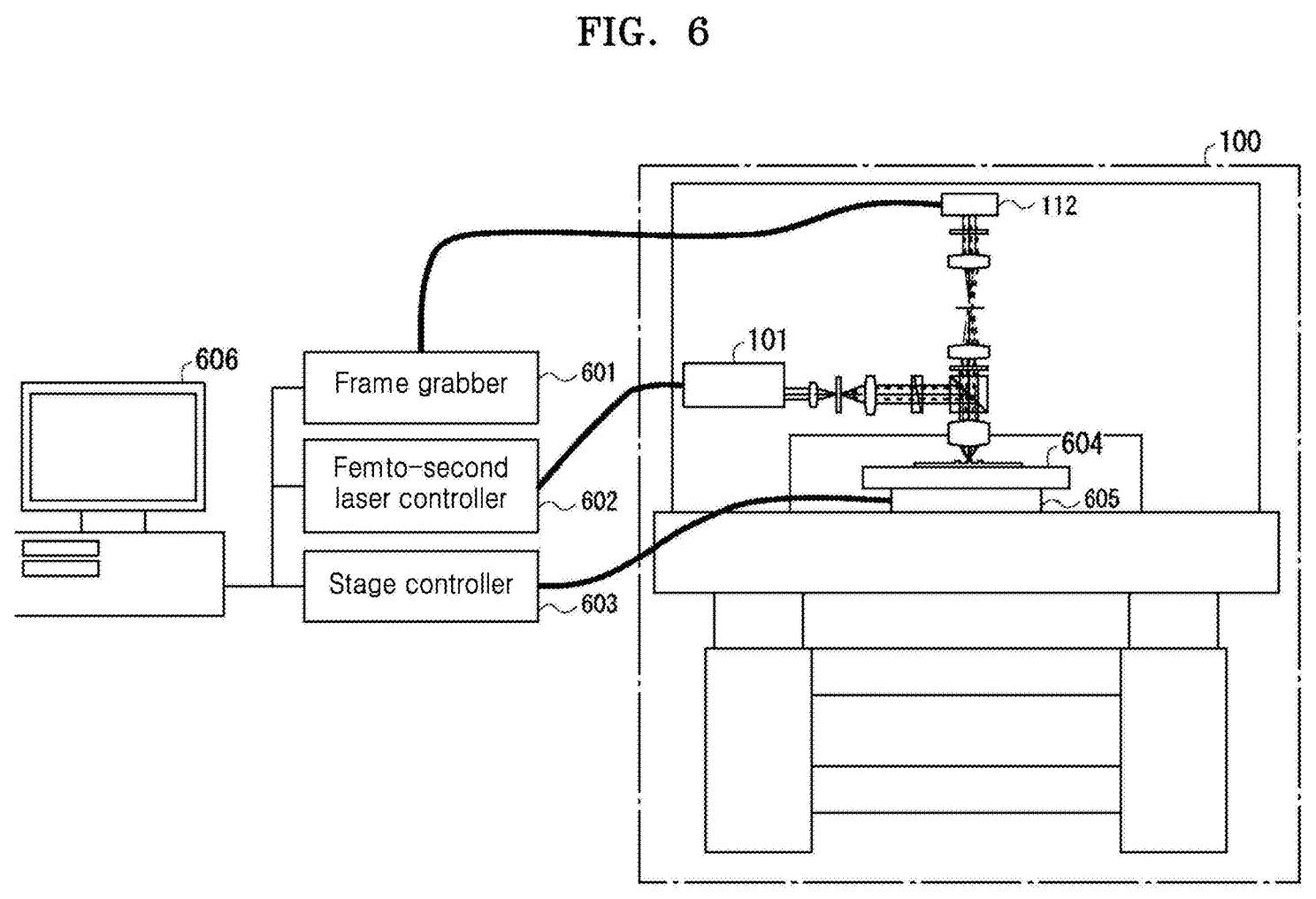

Therefore, wavelength analysis may be performed by Fourier transform and the like to obtain each of the AC component and the DC components of $I_{S1+S2}$ and obtain $|E_{S2}|$ from Equation 6. A silicon wafer that is an object to be measured is fixed by a vacuum chuck or the like on a wafer holder as shown in FIG. 6, and the wafer holder having the silicon wafer mounted thereon may move a measurement point by a wafer stage. FIG. 6 is a schematic diagram illustrating a semiconductor inspection device including the measurement device 100 of FIG. 1, according to an embodiment.

FIG. 6 is described with reference to FIGS. 1 to 5. Referring to FIG. 6, the semiconductor inspection device may include the measurement device 100, a frame grabber 601, a femtosecond laser controller 602, a stage controller 603, a wafer holder 604, a wafer stage 605, and a processing device 606. In FIG. 6, like reference numerals in FIG. 1 may denote like elements, and to the extent that an element is not described in detail with respect to this figure, it may be understood that the element is at least similar to a corresponding element that has been described elsewhere within the present disclosure.

The frame grabber 601 is an interface configured to read a signal from the image detector 112.

The femtosecond laser controller 602 may control the timing and the like of the light source 101.

The stage controller 603 may control the moving direction and moving amount of the wafer stage 605.

The wafer holder 604 may fix a semiconductor (a wafer) that is an object to be measured.

The wafer stage 605 may move the semiconductor (the wafer) that is the object to be measured to a measurement position.

The processing device 606 may obtain a strength by applying the equations described above to the signal from the image detector 112.

For example, the processing device 606 may split an AC component and a DC component of an interference pattern by using Fourier transform and obtain the strength of a second-second harmonic by using both the AC component and the DC component. The processing device 606 preferably includes, for example, a computer.

According to the measurement device 100 of FIG. 1, the strength of a detection signal may be dramatically improved in second harmonic measurement capable of measuring surface contamination or an internal dopant amount of a semiconductor device being manufactured. At present, a measurement time of about 1 second to about 10 seconds per measurement of one point may be reduced by about a one-digit number to about a several-digit number, thereby measuring a greater number of semiconductor wafers. In addition, when speed-up is used for distribution on the surface of a wafer, it is possible to measure a plurality of points within a pre-exposure shot with a measurement point count of about 100 instead of a few points within the wafer, within the same measurement time as usual, thereby dramatically improving the feedback precision of a process.

Figure 7:
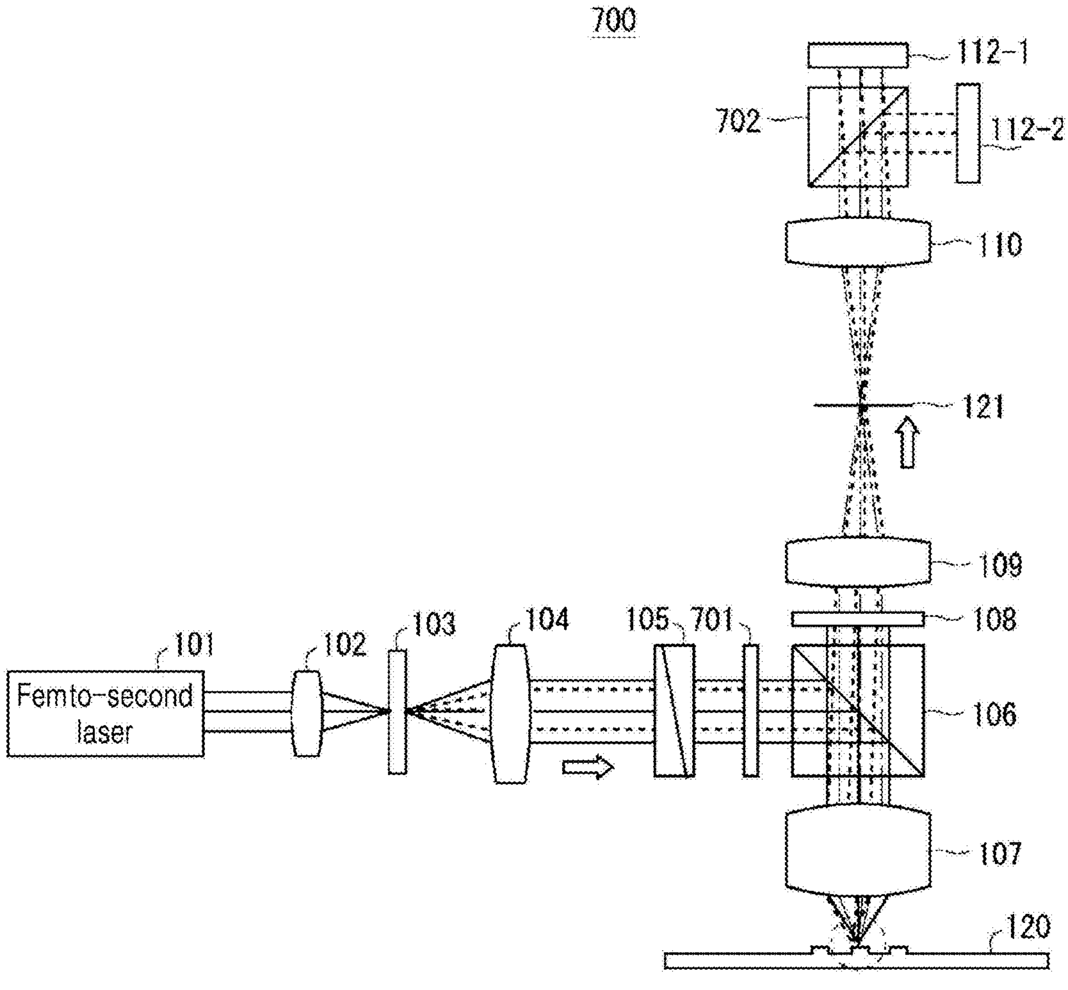
FIG. 7 is a cross-sectional view of a measurement device according to an embodiment.

FIG. 7 is a cross-sectional view of a measurement device 700 according to an embodiment.

With reference to FIG. 7, an example of converting a first-second harmonic into circular polarization and applying the circular polarization is described. Referring to FIG. 7, the measurement device 700 may include the light source 101, the condensing lens 102, the nonlinear optical crystal 103, the collimator lens 104, the birefringent crystal 105, a wavelength plate 701, the beam splitter 106, the objective lens 107, a dichroic filter as the wavelength selection element 108, the relay lenses 109 and 110, the relay lens iris 121, a beam splitter 702, a first image detector 112-1, and a second image detector 112-2. In FIG. 7, like reference numerals in FIG. 1 may denote like elements, and to the extent that an element is not described in detail with respect to this figure, it may be understood that the element is at least similar to a corresponding element that has been described elsewhere within the present disclosure.

The wavelength plate 701 may transform the first-second harmonic from linear polarization into circular polarization. The first-second harmonic transformed into the circular polarization is incident to the beam splitter 106.

The beam splitter 702 may output two polarization components that are perpendicular to each other such that the two polarization components are respectively incident to the first image detector 112-1 and the second image detector 112-2 that are two image detectors. For example, the beam splitter 702 may split each of the first-second harmonic having passed through the wavelength plate 701 and a second-second harmonic into the two polarization components that are perpendicular to each other.

The first image detector 112-1 and the second image detector 112-2 receive the two polarization components that are perpendicular to each other and convert the same into electrical signals, respectively. As described above, information about the second-second harmonic corresponding to each polarizing direction may be obtained, thereby obtaining information corresponding to an amplitude strength ratio ($\psi$) and a phase difference ($\Delta$) for each polarization.

Figure 8:
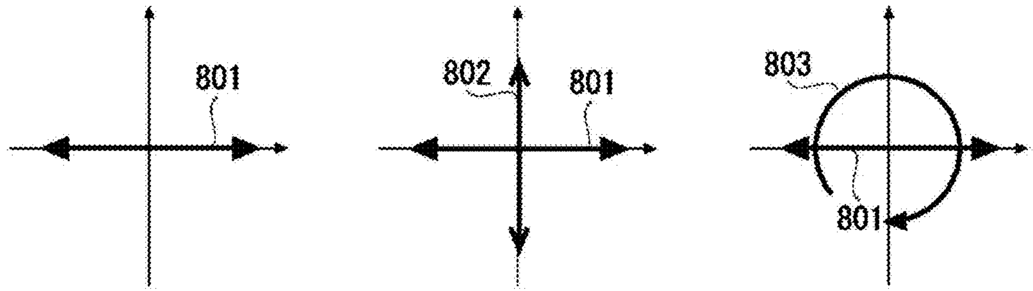
FIG. 8 is a conceptual diagram illustrating a polarization state in an optical axis cross-section in the measurement device of FIG. 7, according to an embodiment.

FIG. 8 is a conceptual diagram illustrating a polarization state on an optical axis cross-section in the measurement device 700 of FIG. 7, according to an embodiment.

FIG. 8 is described with reference to FIG. 7. In FIG. 8, element (a) illustrates a polarization 801 of the fundamental wave of the laser beam traveling toward the condensing lens 102 from the light source 101. In addition, element (b) illustrates the polarization 801 of the fundamental wave of the laser beam and a polarizations 802 of the first-second harmonic of the laser beam traveling toward the beam splitter 106 from the collimator lens 104. Element (c) illustrates a polarization 803 of the first-second harmonic of the laser beam transformed into the circular polarization by the wavelength plate 701.

Figure 9:
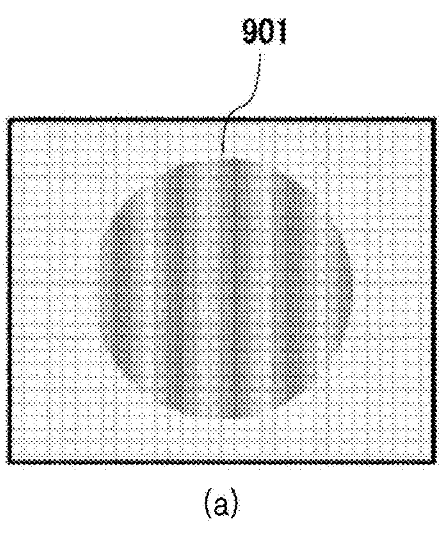
FIG. 9 is a diagram illustrating an interference pattern on an image detector in the measurement device of FIG. 7, according to an embodiment.
Figure 9:
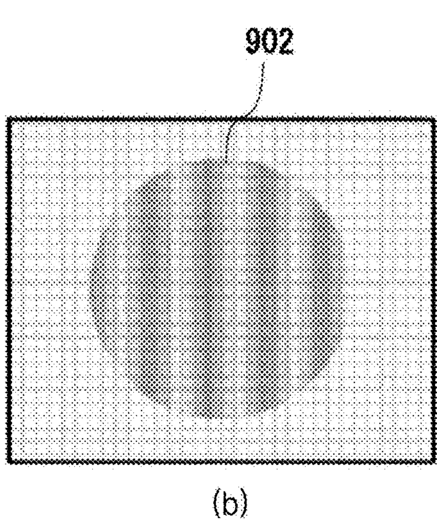

FIG. 9 illustrates an interference pattern on the first and second image detectors 112-1 and 112-2 in the measurement device 700 of FIG. 7, according to an embodiment.

FIG. 9 is described with reference to FIGS. 7 and 8. As shown in FIG. 9, on a two-dimensional grating of the image detector 112, interference patterns appear at positions where a first-second harmonic and a second-second harmonic of a laser beam are cast. In more detail, an interference pattern 901 on the first image detector 112-1 and an interference pattern 902 on the second image detector 112-2 are shown. Both the interference patterns 901 and 902 may have different shapes. An axis on or a rotating direction in which the first-second harmonic and the second-second harmonic interfere with each other to form the interference pattern 901 may differ from an axis on or a rotating direction in which the first-second harmonic and the second-second harmonic interfere with each other to form the interference pattern 902.

According to the measurement device 700 of FIG. 7, by transforming the first-second harmonic into circular polarization, measurement may be performed regardless of a polarization bearing extracted by a polarization beam splitter.

Furthermore, although the polarization state of a fundamental wave does not change before and after the wavelength plate 701 of FIG. 7, the polarization state of the fundamental wave may be transformed into circular polarization in the same manner as the first-second harmonic. In this case, if the material of the wavelength plate 701 is crystal, a thickness may be properly selected, and if a wavelength plate having crystal and magnesium fluoride bonded to each other is used, the transformation may be more easily realized.

In addition, according to a mounting bearing of the polarization beam splitter, the first-second harmonic and the second-second harmonic of the laser beam may be measured even without a wavelength plate.

Figure 10:
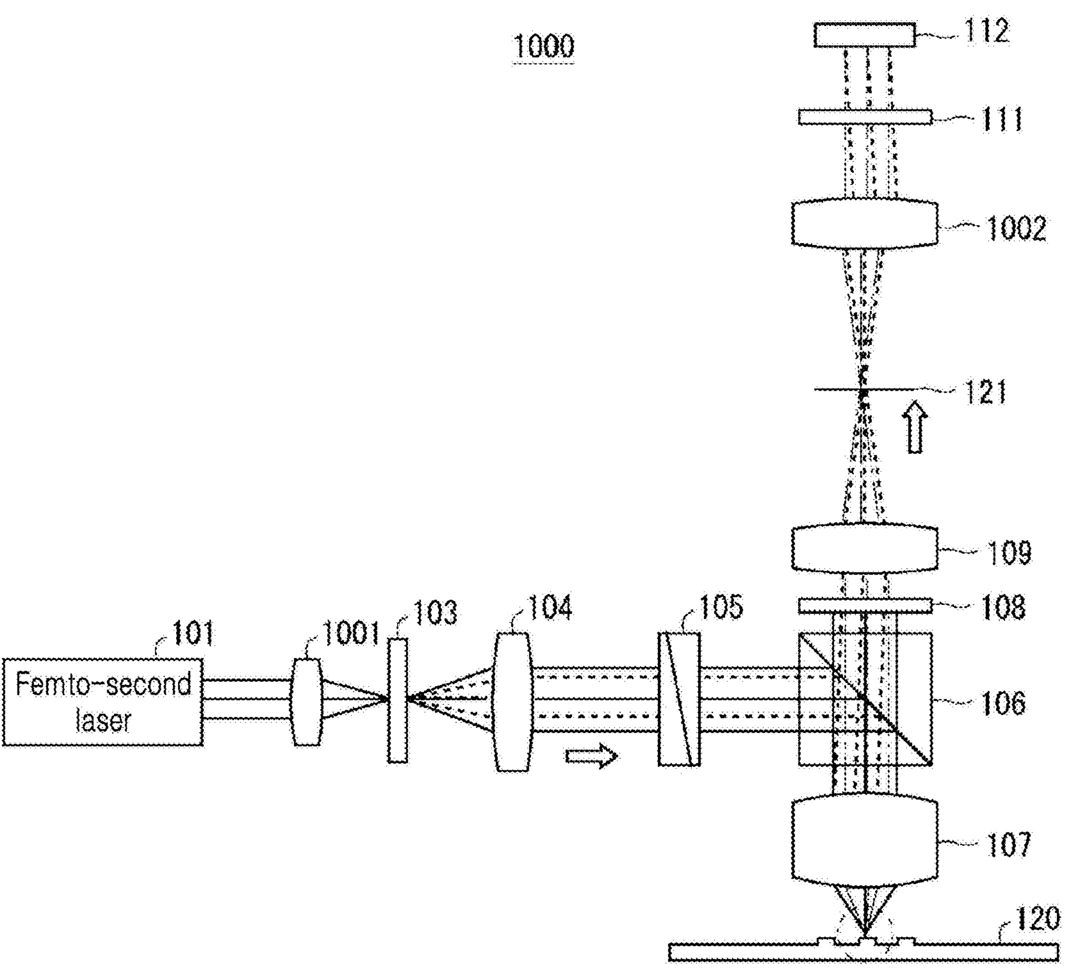
FIG. 10 is a cross-sectional view of a measurement device according to an embodiment.

FIG. 10 is a cross-sectional view of a measurement device 1000 according to an embodiment. In FIG. 10, an example of allowing linear (herein, linear indicates a line as a figure) light to be cast onto an object to be measured by using a cylindrical lens as a lens before a nonlinear optical crystal is described.

Referring to FIG. 10, the measurement device 1000 may include the light source 101, a cylindrical lens 1001, the nonlinear optical crystal 103, the collimator lens 104, the birefringent crystal 105, the beam splitter 106, the objective lens 107, a dichroic filter as the wavelength selection element 108, relay lenses 109 and 1002, the linear polarizing plate 111, and the image detector 112. In FIG. 10, like reference numerals in FIG. 1 may denote like elements, and to the extent that an element is not described in detail with respect to this figure, it may be understood that the element is at least similar to a corresponding element that has been described elsewhere within the present disclosure.

The cylindrical lens 1001 may make a fundamental wave and a first-second harmonic of a laser beam emitted from the light source 101 be linear when viewing on a surface perpendicular to an optical axis.

The relay lens 1002 may include a cylindrical lens.

The image detector 112 has an optically approximately conjugate relationship with the surface of the object 120 to be measured within a surface including a line projected on the object 120 to be measured and the optical axis of the relay lens 1002 and has an optically approximately conjugate relationship with an exit pupil area of the objective lens 107 within a surface (the paper surface of FIG. 10) perpendicular to the surface including the line projected on the object 120 to be measured and the optical axis of the relay lens 1002. Furthermore, the image detector 112 may have an optically conjugate relationship with the exit pupil area of the objective lens 107 within the surface (the paper surface of FIG. 10).

Figure 11:
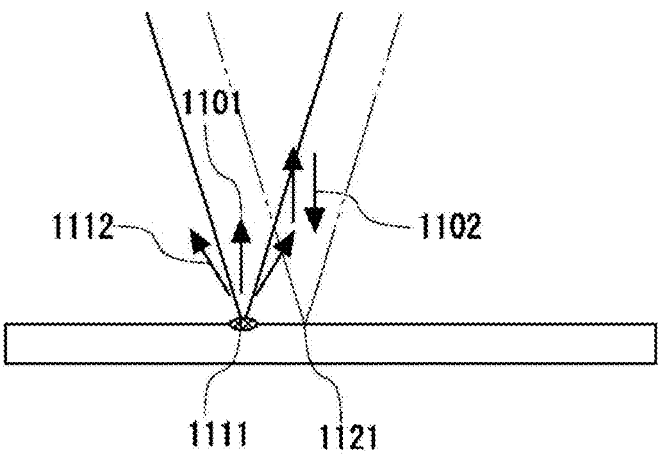
FIG. 11 is a magnified view illustrating an optical path around an object to be measured, in the measurement device of FIG. 10, according to an embodiment.
Figure 12:
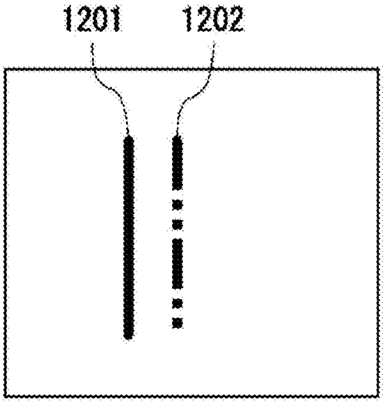
FIG. 12 is a diagram illustrating a second harmonic generated by an illumination optical system in the measurement device of FIG. 10, according to an embodiment.

FIG. 11 is a magnified view illustrating an optical path around an object to be measured, in the measurement device 1000 of FIG. 10, according to an embodiment. FIG. 12 illustrates a second harmonic generated by an illumination optical system in the measurement device 1000 of FIG. 10, according to an embodiment.

Referring to FIG. 11, a fundamental wave 1101 of a laser beam is reflected from a measurement point 1111, and a second-second harmonic 1112 is simultaneously generated on the surface of the object to be measured. In addition, a first-second harmonic 1102 is reflected from a position 1121 off from the measurement point 1111.

Referring to FIG. 12, on a surface perpendicular to an optical axis, a fundamental wave 1201 and a first-second harmonic 1202 generated by an illumination optical system are linear. Furthermore, although FIG. 12 shows that the first-second harmonic 1202 is indicated by a broken line to distinguish the same from the fundamental wave 1201, the first-second harmonic 1202 actually has a continuous line.

Figure 13:
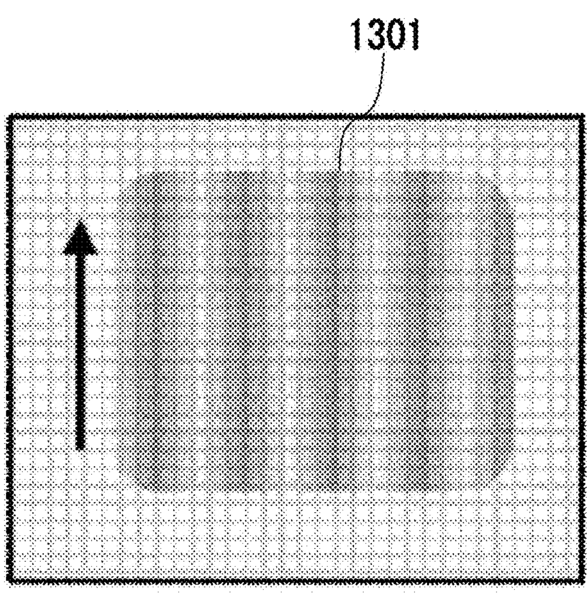
FIG. 13 is a diagram illustrating an interference pattern on an image detector in the measurement device of FIG. 10, according to an embodiment.

FIG. 13 illustrates an interference pattern on the image detector 112 in the measurement device 1000 of FIG. 10, according to an embodiment.

As shown in FIG. 13, an interference pattern 1301 appears by interference of two second harmonics.

According to the measurement device 1000 of FIG. 10, a second-second harmonic may be independently measured within a line projected on an object to be measured, thereby enabling substantial reduction of a measurement time or substantial expansion of a measurement region.

Furthermore, the inventive concept is not necessarily limited to the embodiments described above and may be properly modified without departing from the scope. For example, although the embodiments use a semiconductor as an object to be measured, the object to be measured may be another material. In addition, the measurement devices, according to the embodiments, may obtain the thickness of a silicon dioxide ($SiO_2$) layer on the surface of a semiconductor, metal contamination of $SiO_2$ on the surface of the semiconductor, a defect amount of the boundary between $SiO_2$ and a semiconductor substrate, an impurity dopant amount of the semiconductor substrate, and re-crystallization of the semiconductor substrate from strength information of a second-second harmonic obtained by measurement.

While the inventive concept has been particularly shown and described with reference to embodiments thereof, it will be understood that various changes in form and details may be made therein without departing from the spirit and scope of the following claims.

What is claimed is:

1. A measurement device, comprising:

a light source configured to emit a fundamental wave that is a femtosecond pulsed laser beam;

a second harmonic generator configured to convert a portion of the fundamental wave into a first-second harmonic;

a birefringent crystal configured to split an angle for the first-second harmonic;

a wavelength selection element configured to block the fundamental wave and transmit therethrough the first-second harmonic and a second-second harmonic;

a polarizer configured to polarize the first-second harmonic and the second-second harmonic to have approximately a same polarization;

an image detector configured to convert the first-second harmonic and the second-second harmonic, which are incident at different angles from each other, into an electrical signal; and a processing device configured to obtain a strength of the second-second harmonic from an amplitude of an interference pattern appearing on the image detector, wherein a wavelength of the first-second harmonic is approximately half a wavelength of the fundamental wave, and the second-second harmonic is generated by casting the fundamental wave onto a surface of an object to be measured.

2. The measurement device of claim 1, further comprising:

a wavelength plate configured to transform, into circular polarization, the first-second harmonic of which the angle is split by the birefringent crystal; and a beam splitter configured to split, into two polarization components, the first-second harmonic having passed through the wavelength selection element and the second-second harmonic having passed through the wavelength selection element, wherein the image detector comprises:

a first image detector configured to convert one of the two polarization components into an electrical signal; and a second image detector configured to convert the other of the two polarization components into an electrical signal.

3. The measurement device of claim 1, further comprising a cylindrical lens configured to transform the fundamental wave emitted from the light source, to be linear with reference to a surface perpendicular to an optical axis, wherein the second harmonic generator is further configured to convert a portion of the fundamental wave into the first-second harmonic having a wavelength that is half the wavelength of the fundamental wave.

4. The measurement device of claim 1, wherein the birefringent crystal is determined such that the fundamental wave and the first-second harmonic have linear polarizations perpendicular to each other in an illumination optical system and optical path lengths of the fundamental wave and the first-second harmonic from the second harmonic generator to the surface of the object to be measured are approximately the same.

5. The measurement device of claim 1, wherein the image detector and the birefringent crystal are arranged with an optically approximately conjugate positional relationship with respect to each other.

6. The measurement device of claim 1, wherein the image detector and an exit pupil area of an objective optical system are arranged with an optically approximately conjugate positional relationship with respect to each other.

7. The measurement device of claim 1, wherein the birefringent crystal includes a Wollaston prism, a Rochon prism, and/or a Nomarski prism.

8. The measurement device of claim 1, wherein the object to be measured includes a semiconductor device.

9. The measurement device of claim 1, wherein the processing device is further configured to separate an alternating current (AC) component and a direct current (DC) component of the interference pattern by using Fourier transform and obtain a strength of the second-second harmonic by using both the AC component and the DC component.

10. The measurement device of claim 1, wherein the measurement device is configured to obtain a thickness of a silicon dioxide ($SiO_2$) layer on a surface of a semiconductor, metal contamination of $SiO_2$ on a surface of a semiconductor, a defect amount of a boundary between $SiO_2$ and a semiconductor substrate, an impurity dopant amount of a semiconductor substrate, and/or re-crystallization of a semiconductor substrate from strength information of the second-second harmonic.

11. The measurement device of claim 1, wherein the wavelength selection element comprises a dichroic filter.

12. The measurement device of claim 1, wherein the wavelength selection element comprises:

a prism configured to change a traveling direction of light for each wavelength; and a relay lens iris configured to transmit therethrough the first-second harmonic and the second-second harmonic.

13. The measurement device of claim 1, wherein the wavelength selection element comprises:

a refractive grating configured to change a traveling direction of light for each wavelength; and a relay lens iris configured to transmit therethrough the first-second harmonic and the second-second harmonic.

14. A measurement device, comprising:

a second harmonic generator comprising a nonlinear optical crystal configured to convert, into a first-second harmonic, a portion of a fundamental wave emitted from a light source;

a condensing lens configured to concentrate the fundamental wave onto the second harmonic generator;

a birefringent crystal configured to split an angle for the first-second harmonic;

a collimator lens arranged between the second harmonic generator and the birefringent crystal, and configured to refract the fundamental wave and the first-second harmonic to form parallel light;

a wavelength selection element configured to block the fundamental wave and transmit therethrough the first-second harmonic and a second-second harmonic;

a polarizer arranged between a plurality of relay lens and configured to polarize the first-second harmonic and the second-second harmonic to approximately same polarizations;

an image detector configured to convert the first-second harmonic and the second-second harmonic, which are incident at different angles from each other, into an electrical signal;

a processing device configured to obtain a strength of the second-second harmonic from an amplitude of an interference pattern appearing on the image detector;

a wavelength plate configured to transform, into circular polarization, the first-second harmonic of which the angle is split by the birefringent crystal; and a beam splitter configured to split, into two polarization components, the first-second harmonic having passed through the wavelength selection element and the second-second harmonic having passed through the wavelength selection element.

15. The measurement device of claim 14, wherein a frequency of the second-second harmonic is approximately two times a frequency of the fundamental wave, the second-second harmonic is generated when the fundamental wave is cast onto a surface of an object to be measured, and wherein the image detector comprises:

a first image detector configured to convert, into an electrical signal, one of the two polarization components of the second-second harmonic split by the beam splitter; and a second image detector configured to convert the other of the two polarization components into an electrical signal.

16. The measurement device of claim 14, wherein the measurement device is configured to obtain a thickness of a silicon dioxide ($SiO_2$) layer on a surface of a semiconductor, metal contamination of $SiO_2$ on a surface of a semiconductor, a defect amount of a boundary between $SiO_2$ and a semiconductor substrate, an impurity dopant amount of a semiconductor substrate, and/or re-crystallization of a semiconductor substrate from strength information of the second-second harmonic.

17. The measurement device of claim 14, further comprising a cylindrical lens configured to transform the fundamental wave to be linear with reference to a surface perpendicular to an optical axis, wherein the birefringent crystal is determined such that:

the fundamental wave and the first-second harmonic have linear polarizations perpendicular to each other in an illumination optical system; and optical path lengths of the fundamental wave and the first-second harmonic from the second harmonic generator to a surface of an object to be measured are approximately the same.

18. The measurement device of claim 14, wherein the image detector and the birefringent crystal are arranged with an optically approximately conjugate positional relationship with respect to each other, and the image detector and an exit pupil area of an objective optical system are arranged with an optically approximately conjugate positional relationship with respect to each other.

19. The measurement device of claim 14, wherein the birefringent crystal includes a Wollaston prism, a Rochon prism, and/or a Nomarski prism, and the processing device is further configured to separate an alternating current (AC) component and a direct current (DC) component of the interference pattern by using Fourier transform and obtain a strength of the second-second harmonic by using both the AC component and the DC component.

20. A measurement device, comprising:

a second harmonic generator comprising a nonlinear optical crystal configured to convert, into a first-second harmonic, a portion of a fundamental wave emitted from a light source;

a condensing lens configured to concentrate the fundamental wave onto the second harmonic generator;

a birefringent crystal configured to split an angle for the first-second harmonic;

a collimator lens arranged between the second harmonic generator and the birefringent crystal and configured to refract the fundamental wave and the first-second harmonic to form parallel light;

a wavelength selection element configured to block the fundamental wave and transmit therethrough the first-second harmonic and a second-second harmonic;

a polarizer arranged between a plurality of relay lens and configured to polarize the first-second harmonic and the second-second harmonic to approximately same polarizations;

an image detector configured to convert the first-second harmonic and the second-second harmonic, which are incident at different angles from each other, into an electrical signal;

a processing device configured to obtain a strength of the second-second harmonic from an amplitude of an interference pattern appearing on the image detector;

a wavelength plate configured to transform, into circular polarization, the first-second harmonic of which the angle is split by the birefringent crystal; and a beam splitter configured to split, into two polarization components, the first-second harmonic having passed through the wavelength selection element and the second-second harmonic having passed through the wavelength selection element, wherein the image detector comprises:

a first image detector configured to convert, into an electrical signal, one of the two polarization components of the second-second harmonic split by the beam splitter; and a second image detector configured to convert the other of the two polarization components into an electrical signal, and wherein the wavelength selection element comprises:

a prism configured to change a traveling direction of light for each wavelength;

a refractive grating configured to change a traveling direction of light for each wavelength; and a relay lens iris configured to transmit therethrough the first-second harmonic and the second-second harmonic.

* * * * *